United States Patent
Chaudhry

(10) Patent No.: US 9,961,265 B2
(45) Date of Patent: May 1, 2018

(54) METHOD FOR CAPTURING AND STORING HISTORIC AUDIOVISUAL DATA VIA A DIGITAL MIRROR

(71) Applicant: Shafiq Ahmad Chaudhry, Franklin, NH (US)

(72) Inventor: Shafiq Ahmad Chaudhry, Franklin, NH (US)

( * ) Notice: Subject to any disclaimer, the term of this patent is extended or adjusted under 35 U.S.C. 154(b) by 0 days. days.

(21) Appl. No.: 14/876,536

(22) Filed: Oct. 6, 2015

(65) Prior Publication Data
US 2016/0100097 A1 Apr. 7, 2016

Related U.S. Application Data

(60) Provisional application No. 62/060,207, filed on Oct. 6, 2014.

(51) Int. Cl.
*H04N 5/232* (2006.01)
*H04N 5/77* (2006.01)
*H04N 9/82* (2006.01)

(52) U.S. Cl.
CPC ......... *H04N 5/23293* (2013.01); *H04N 5/772* (2013.01); *H04N 9/8205* (2013.01)

(58) Field of Classification Search
CPC ... H04N 5/23293; H04N 5/772; H04N 9/8205
See application file for complete search history.

(56) References Cited

U.S. PATENT DOCUMENTS

| | | | | |
|---|---|---|---|---|
| 8,095,949 B1* | 1/2012 | Hendricks | ............ | H04N 5/4403 345/901 |
| 8,767,145 B1* | 7/2014 | Zhang | ................. | G02F 1/13471 349/114 |
| 8,892,594 B1* | 11/2014 | Khafizov | .......... | G06F 17/30864 707/704 |
| 2002/0003571 A1* | 1/2002 | Schofield | ................ | B60C 23/00 348/148 |
| 2002/0080494 A1* | 6/2002 | Meine | ...................... | A47G 1/02 359/630 |
| 2008/0092941 A1* | 4/2008 | Kuo | ....................... | G06F 1/1616 136/248 |
| 2008/0106389 A1* | 5/2008 | Desai | .................... | B60Q 1/2665 340/425.5 |
| 2009/0153288 A1* | 6/2009 | Hope | .................... | G06F 3/0482 340/3.1 |
| 2009/0167873 A1* | 7/2009 | Sakaue | ..................... | B41J 2/175 348/207.2 |
| 2011/0085016 A1* | 4/2011 | Kristiansen | ......... | G06F 3/04883 348/14.03 |

(Continued)

*Primary Examiner* — Amy Hsu

(57) ABSTRACT

A method for capturing and storing historic audiovisual data via a digital mirror allows a digital display to be utilized as a digital mirror. The digital display includes a touchscreen that is divided into a first portion with a live video feed and a second portion with a graphical user interface (GUI). An image-capture device and a microphone are able to capture audiovisual media data that is saved onto a data storage device. The audiovisual media data may be searched at a later time in order to view specific audiovisual media data captured at a previous time. The digital display may be activated via a plurality of display activation triggers that is intended to provide security and prevent unauthorized access to the digital display.

13 Claims, 14 Drawing Sheets

(56) References Cited

U.S. PATENT DOCUMENTS

| | | | |
|---|---|---|---|
| 2011/0085204 A1* | 4/2011 | Hamada | H04N 1/387 358/1.15 |
| 2011/0115931 A1* | 5/2011 | Kulinets | H04N 1/00251 348/211.2 |
| 2012/0075452 A1* | 3/2012 | Ferren | G02B 13/0065 348/78 |
| 2014/0123273 A1* | 5/2014 | Matus | G06F 21/32 726/17 |
| 2014/0139717 A1* | 5/2014 | Short | H04N 7/142 348/333.1 |
| 2015/0186073 A1* | 7/2015 | Pacurariu | G06F 3/0655 710/74 |
| 2016/0066011 A1* | 3/2016 | Ro | H04N 21/42222 725/38 |

\* cited by examiner

Receiving the search query through the GUI,
wherein the GUI is the user input device

FIG. 11

Receiving the search query through the microphone, wherein the microphone is the user input device

FIG. 12

Receiving the search query through the external electronic device, wherein the external electronic device is the user input device

FIG. 13

METHOD FOR CAPTURING AND STORING HISTORIC AUDIOVISUAL DATA VIA A DIGITAL MIRROR

The current application claims a priority to the U.S. Provisional Patent application Ser. No. 62/060,207 filed on Oct. 6, 2014.

FIELD OF THE INVENTION

The present invention relates generally to a method for utilizing a digital display in a digital mirror application. More specifically, the present invention is a method for capturing and storing historic audiovisual data via a digital mirror.

BACKGROUND OF THE INVENTION

The mirror is one of the most commonly utilized items in the home as well as in general. Mirrors are typically found in bedrooms and bathrooms and are utilized for personal grooming as well as vanity purposes. While a mirror is useful for tracking a person's everyday appearance, a mirror is generally of little to no use when the person wishes to monitor changes in bodily appearance over an extended period of time. This is particularly desirable if the person is engaging in lifestyle changes such as increased exercise and/or dieting and wishes to compare his or her current bodily appearance with his or her bodily appearance at a time in the past. Generally, the only way to accomplish this is by capturing a photograph of his or her bodily appearance on a daily basis over an extended period of time, a process that can be quite tedious and inconvenient.

The present invention seeks to provide a convenient means of addressing the aforementioned issues. The present invention is a method for capturing and storing historic audiovisual data via a digital mirror. A digital display is utilized as a digital mirror through the implementation of an image-capture device and a microphone that are able to capture image, video, and audio media data. The media data may be captured, saved, and accessed by the user at any time, allowing the user to view his or her bodily appearance at any time in the past. The digital display also functions as a conventional mirror by capturing a live audiovisual feed and displaying the live audiovisual feed to the user.

BRIEF DESCRIPTION OF THE DRAWINGS

FIG. 11 is a flowchart depicting the secondary process that is followed by the present invention.

FIG. 12 is a flowchart depicting the secondary process that is followed by the present invention.

FIG. 13 is a flowchart depicting the secondary process that is followed by the present invention.

DETAIL DESCRIPTIONS OF THE INVENTION

All illustrations of the drawings are for the purpose of describing selected versions of the present invention and are not intended to limit the scope of the present invention.

Figure 1:
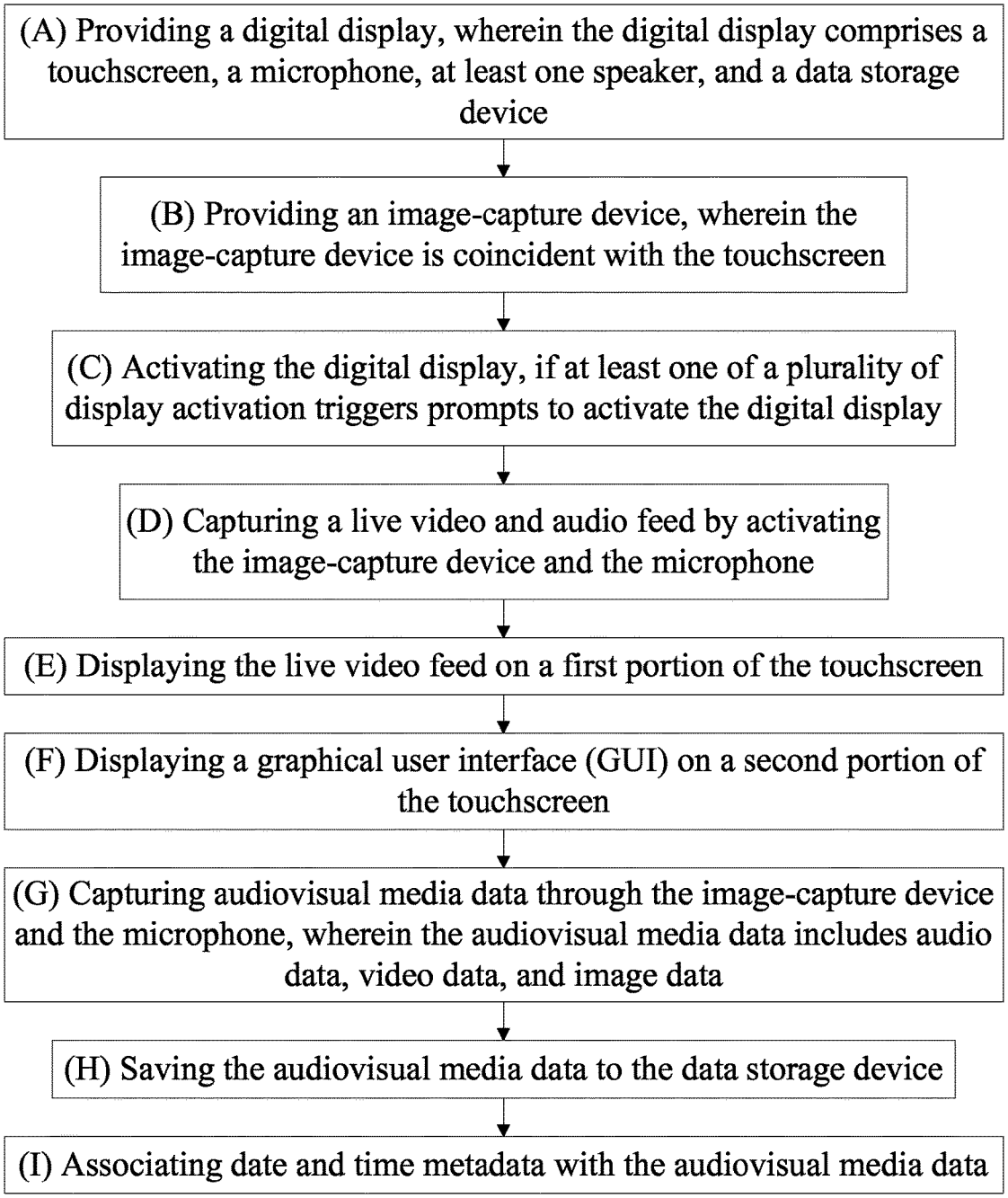
FIG. 1 is a front view of the digital display.

The present invention is a method for capturing and storing historic audiovisual data via a digital mirror. In the preferred embodiment of the present invention, a digital display 1 is utilized as a digital mirror with which the user is able to interact. As shown in FIG. 1, the digital display 1 comprises a touchscreen 2, a microphone 5, at least one speaker 6, and a data storage device. Because the digital display 1 is utilized in environments that are common for conventional mirrors such as bathrooms, the digital display 1 is preferably coated with an antifogging agent. Additionally, the digital display 1 is preferably waterproof. An image-capture device 7 is coincident with the touchscreen 2. This orients the image-capture device 7 in a manner such that the image-capture device 7 is able to observe a user who is standing in front of the digital display 1. The image-capture device 7 is preferably a camera that is capable of capturing both images and video. The images and/or video are output to the touchscreen 2 for viewing. The touchscreen 2 additionally allows the user to input commands and otherwise interact with the digital display 1. The microphone 5 is able to capture audio simultaneously while the image-capture device 7 captures images and/or video. The at least one speaker 6 is able to output audio from the digital display 1 or from audiovisual data during playback. The at least one speaker 6 may play audible sounds that are associated with operating the digital display 1. For example, audible tones may be played through the at least one speaker 6 when the touchscreen 2 is touched. Images, video, and audio are saved to the data storage device and the data storage device is removable and upgradeable. The digital display 1 includes additional computing and electronic hardware such as a processor capable of controlling operation of the digital display 1, additional data storage devices such as RAM (random-access memory) for temporary storage of operational data, and a wireless transceiver.

Figure 2:
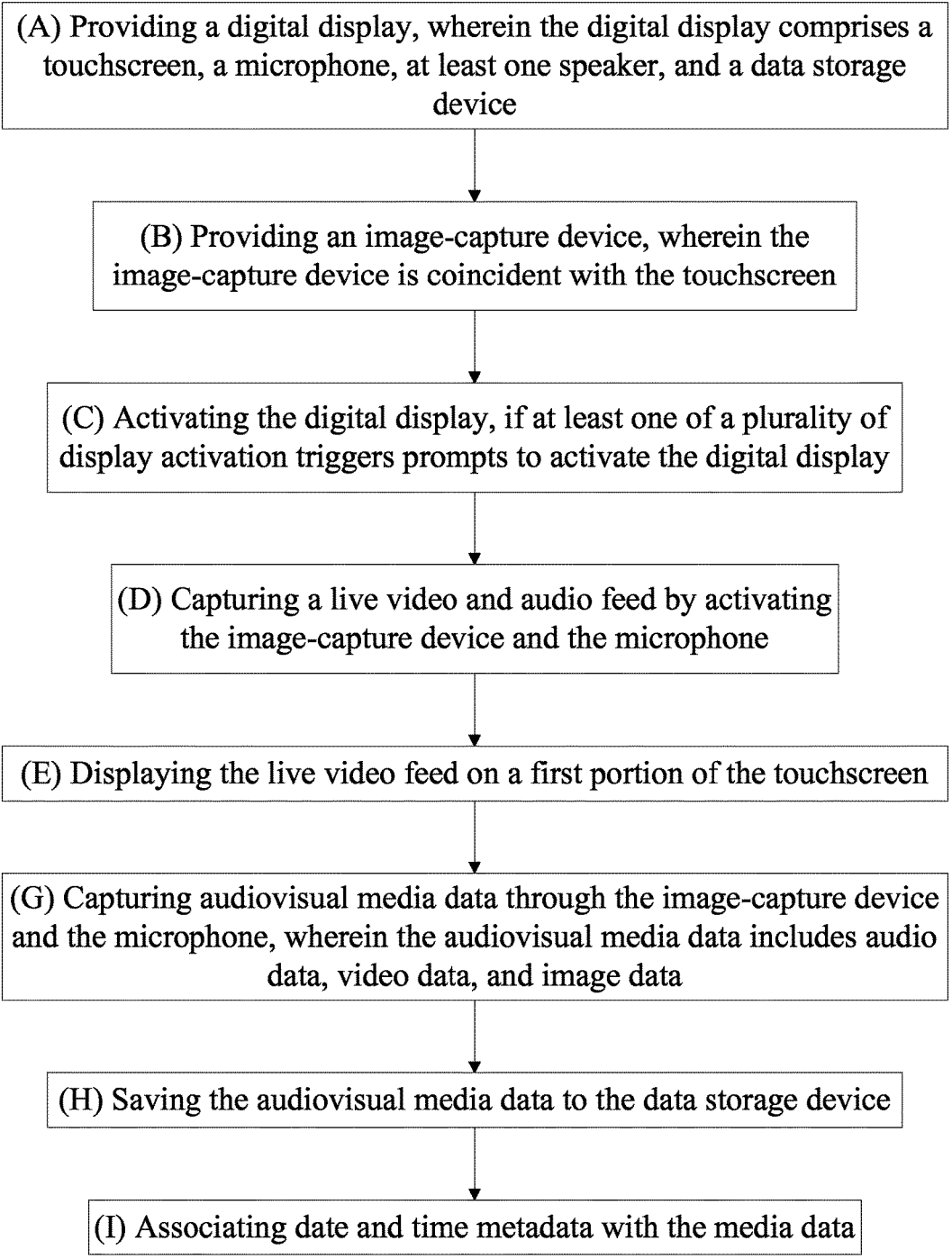
FIG. 2 is a flowchart depicting the overall process that is followed by the present invention.

The overall process that is followed by the present invention is shown in FIG. 2 while the secondary processes that are followed by the present invention are shown in FIGS. 3-11. In order to utilize the digital display 1 as a digital mirror, the digital display 1 is first activated. Referring to FIG. 1 and FIG. 2, the digital display 1 is activated if at least one of a plurality of display activation triggers prompts to activate the digital display 1. The plurality of display activation triggers provides multiple options to the user for activating the digital display 1. Additionally, the plurality of display activation triggers provides a level of security to the digital display 1 if the user does not wish for others to access the digital display 1. After the digital display 1 has been activated, a live video feed and audio feed is captured by activating the image-capture device 7 and the microphone 5. The image-capture device 7 is able to capture a video feed encompassing the front of the digital display 1. Similarly, the microphone 5 is able to capture an audio feed from the vicinity of the digital display 1. The live video feed is displayed on a first portion 3 of the touchscreen 2. The live video feed allows the digital display 1 to be utilized as a digital mirror. The live video feed may be reversed in order to reproduce the live video feed on the first portion 3 of the touchscreen 2 as a mirror image. A graphical user interface (GUI) is displayed on a second portion 4 of the touchscreen 2. The GUI allows the user to input commands and otherwise interact with the digital display 1 through the touchscreen 2. Information may be displayed for the user on the GUI as well. The GUI may be resized, relocated, and otherwise adjusted on the touchscreen 2 as the user desires. As such, the first portion 3 of the touchscreen 2 and the second portion 4 of the touchscreen 2 may be resized. This may be accomplished by various actions including, but not limited to, swiping, pinching, and scrolling with the fingers on the touchscreen 2. The live video feed and the GUI may be two distinct, non-intersecting portions of the touchscreen 2 or alternatively, the GUI may be overlaid upon the live video feed.

The surface of the touchscreen 2 may be reflective, allowing the digital display 1 to be used passively as a conventional mirror when the digital display 1 is not active. This is suitable for conserving energy as the digital display 1 does not need to be activated in order to be utilized as a mirror.

In addition to capturing and displaying the live video feed upon the touchscreen 2, audiovisual media data is captured through the image-capture device 7 and the microphone 5. The audiovisual media data includes audio data, video data, and image data. The audiovisual media data differs from the live video feed and audio feed in that the audiovisual media data can be saved and accessed at a later time. The audiovisual media data is saved to the data storage device for future access. Date and time metadata is associated with the audiovisual media data. The metadata allows the user to perform searches for audiovisual media data that he or she wishes to access. The searches may be performed by inputting search queries that may include the metadata that is associated with the audiovisual media data.

Figure 3:
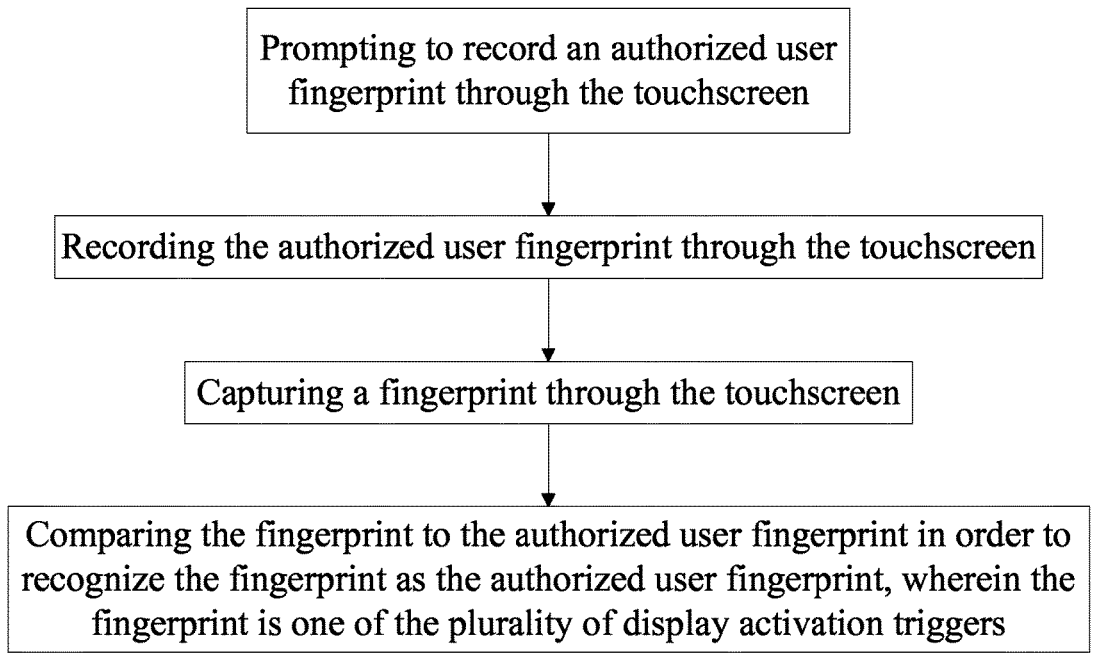
FIG. 3 is a flowchart depicting the secondary process that is followed by the present invention.

As previously discussed, the digital display 1 may be activated by the plurality of display activation triggers. A fingerprint is one of the plurality of display activation triggers that may be inputted to activate the digital display 1. With reference to FIG. 3, the user is prompted to record an authorized user fingerprint through the touchscreen 2. This may be done through the first portion 3 of the touchscreen 2 or the second portion 4 of the touchscreen 2. The authorized user fingerprint is associated with the user and is utilized as a security measure to prevent unauthorized activation of the digital display 1. The authorized user fingerprint is captured through the touchscreen 2, allowing the user to simply place his or her finger into contact with the touchscreen 2. After the authorized user fingerprint has been captured, a fingerprint may be captured through the first portion 3 of the touchscreen 2 or the second portion 4 of the touchscreen 2. The fingerprint is compared to the authorized user fingerprint in order to recognize the fingerprint as the authorized user fingerprint. The fingerprint is one of the plurality of digital display 1 activation triggers and is compared to the authorized user fingerprint in order to determine if there is a match. If the fingerprint matches the authorized user fingerprint, the digital display 1 is activated.

Figure 4:
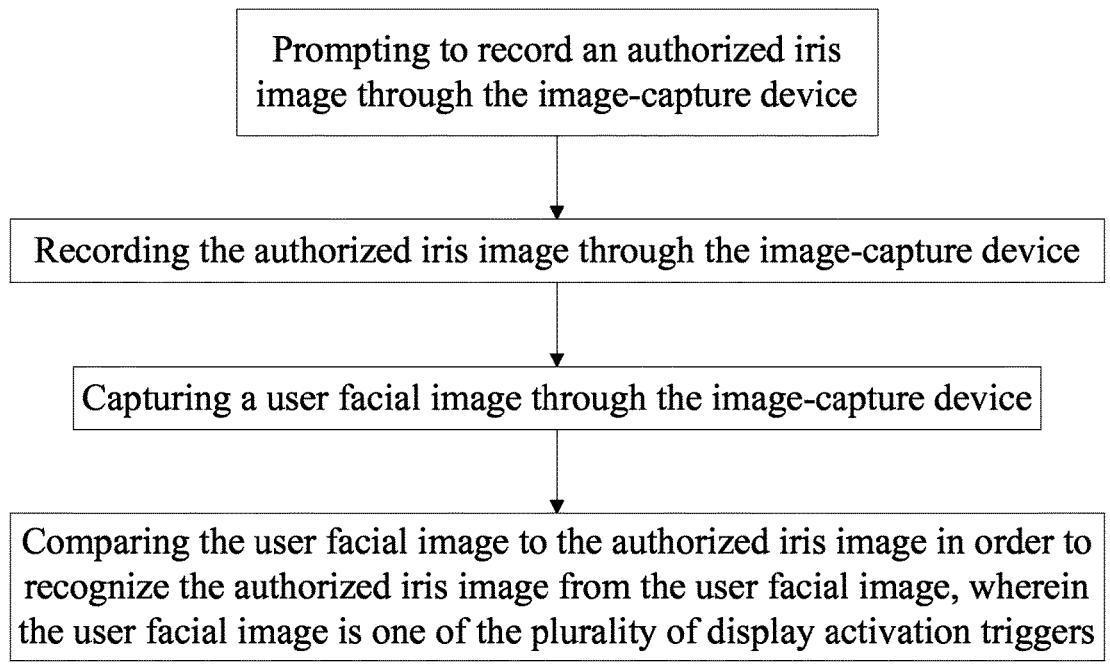
FIG. 4 is a flowchart depicting the secondary process that is followed by the present invention.

A user facial image is one of the plurality of display activation triggers for activating the digital display 1. As shown in FIG. 4, the user is prompted to record an authorized iris image through the image-capture device 7. The user may simply position in front of the touchscreen 2. The authorized iris image is then recorded through the image-capture device 7. After the authorized iris image is recorded, a user facial image may be captured through the image-capture device 7. When the user facial image is captured, the user facial image is compared to the authorized iris image in order to recognize the authorized iris image from the user facial image. The user facial image is one of the plurality of display activation triggers and is compared to the authorized iris image. If the authorized iris image is recognized in the user facial image, the digital display 1 is activated.

Figure 5:
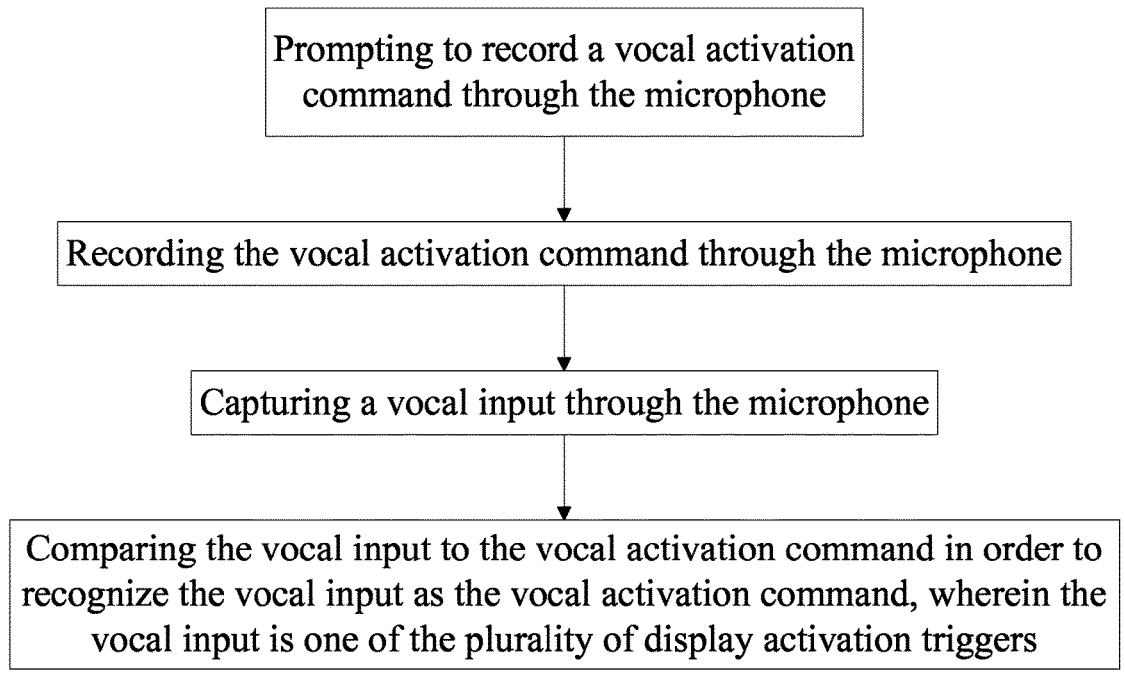
FIG. 5 is a flowchart depicting the secondary process that is followed by the present invention.

In addition to the fingerprint and the user facial image, a vocal input may be utilized as one of the plurality of display activation triggers for activating the digital display 1. Referring to FIG. 5, the user is prompted to record a vocal activation command through the microphone 5. When the user speaks, the vocal activation command is recorded through the microphone 5. After the vocal activation command has been recorded, a vocal input may be captured through the microphone 5. The vocal input is compared to the vocal activation command in order to recognize the vocal input as the vocal activation command. The vocal input is one of the plurality of display activation triggers and is compared to the vocal activation command in order to determine if there is a match. If the vocal input is matched to the vocal activation command, the digital display 1 is activated.

Figure 6:
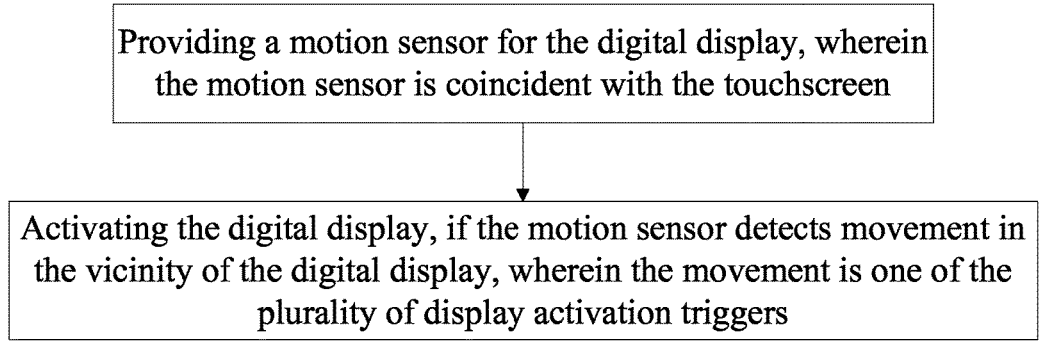
FIG. 6 is a flowchart depicting the secondary process that is followed by the present invention.

If security of the digital display 1 is not considered to be important, a motion sensor 8 for the digital display 1 may be utilized. With reference to FIG. 6, movement in the vicinity of the digital display 1 is one of the plurality of display activation triggers. The motion sensor 8 is coincident with the touchscreen 2, allowing the motion sensor 8 to detect movement in front of the digital display 1. If movement is detected in the vicinity of the digital display 1, the digital display 1 is activated without any further input to the digital display 1.

Figure 7:
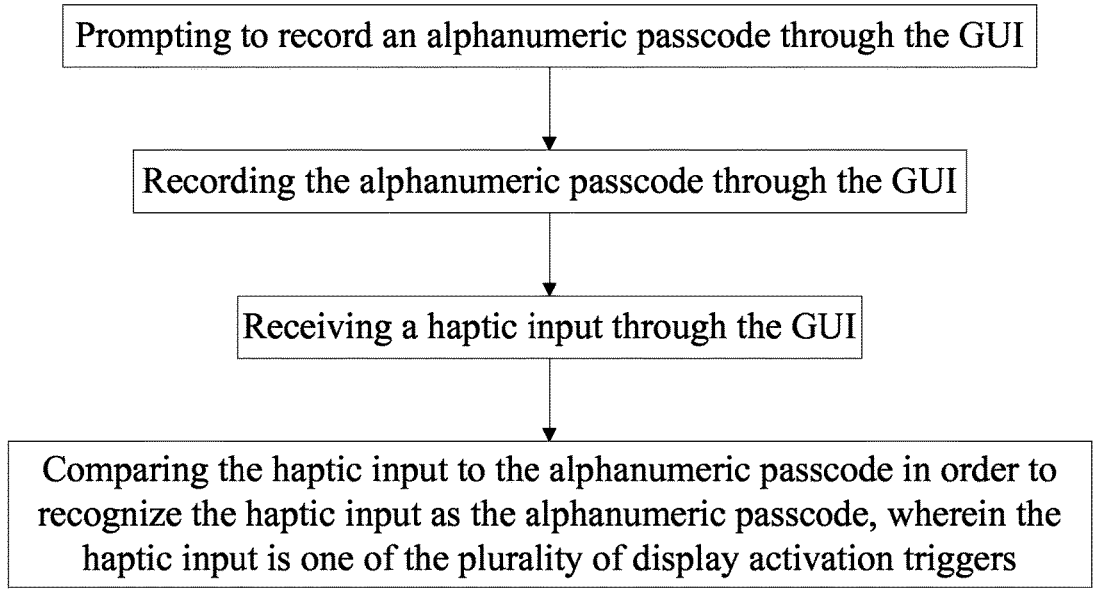
FIG. 7 is a flowchart depicting the secondary process that is followed by the present invention.

A haptic input may be utilized as one of the plurality of display activation triggers. As shown in FIG. 7, the user is prompted to record an alphanumeric passcode through the GUI. The user then records an alphanumeric passcode through the GUI, for example, on a keyboard and/or numeric keypad that is displayed on the GUI. After the alphanumeric passcode is recorded, a haptic input may be received through the GUI. The haptic input is compared to the alphanumeric passcode in order to recognize the haptic input as the alphanumeric passcode. The haptic input is one of the plurality of display activation triggers and is compared to the alphanumeric passcode in order to determine if there is a match. If the haptic input matches the alphanumeric passcode, the digital display 1 is activated.

Figure 8:
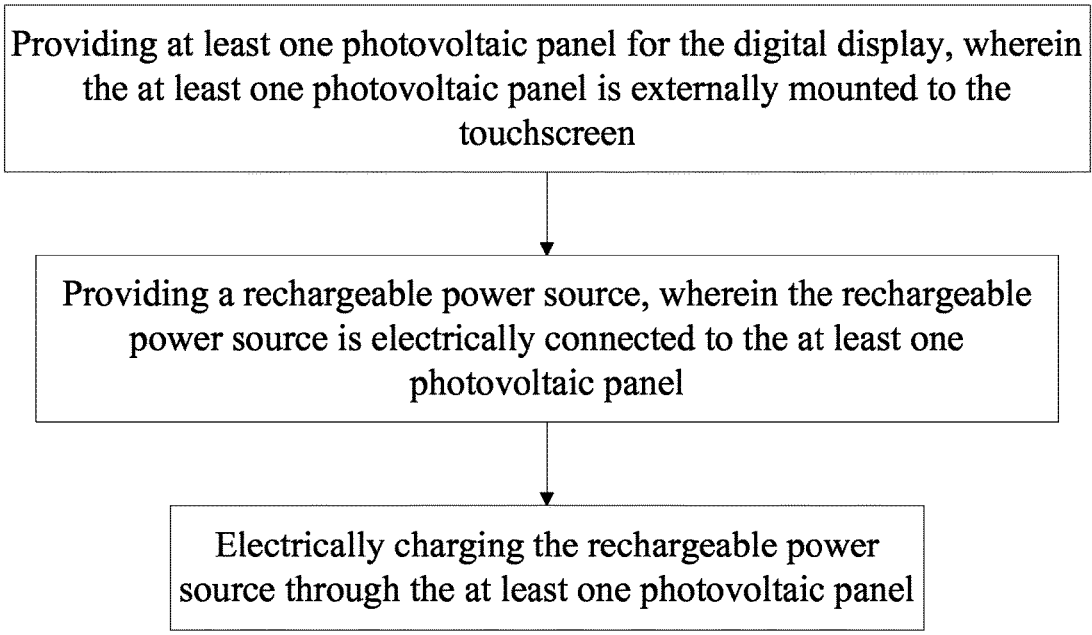
FIG. 8 is a flowchart depicting the secondary process that is followed by the present invention.

The digital display 1 of the present invention is preferably powered by a rechargeable power source. The digital display 1 may additionally be connected to an external power source such as mains electricity as needed. The rechargeable power source is configured to be contained within the digital display 1. As shown in FIG. 1 and FIG. 8, at least one photovoltaic panel 9 for the digital display 1 may be utilized to charge the rechargeable power source. The at least one photovoltaic panel 9 is externally mounted to the touchscreen 2 to collect and convert solar energy to direct current (DC) electricity. The rechargeable power source is electrically connected to the at least one photovoltaic panel 9 and the rechargeable power source is electrically charged through the at least one photovoltaic panel 9. If additional power is required, the rechargeable power source may be connected to the external power source. However, the digital display 1 may be utilize any power source that is available.

Figure 9:
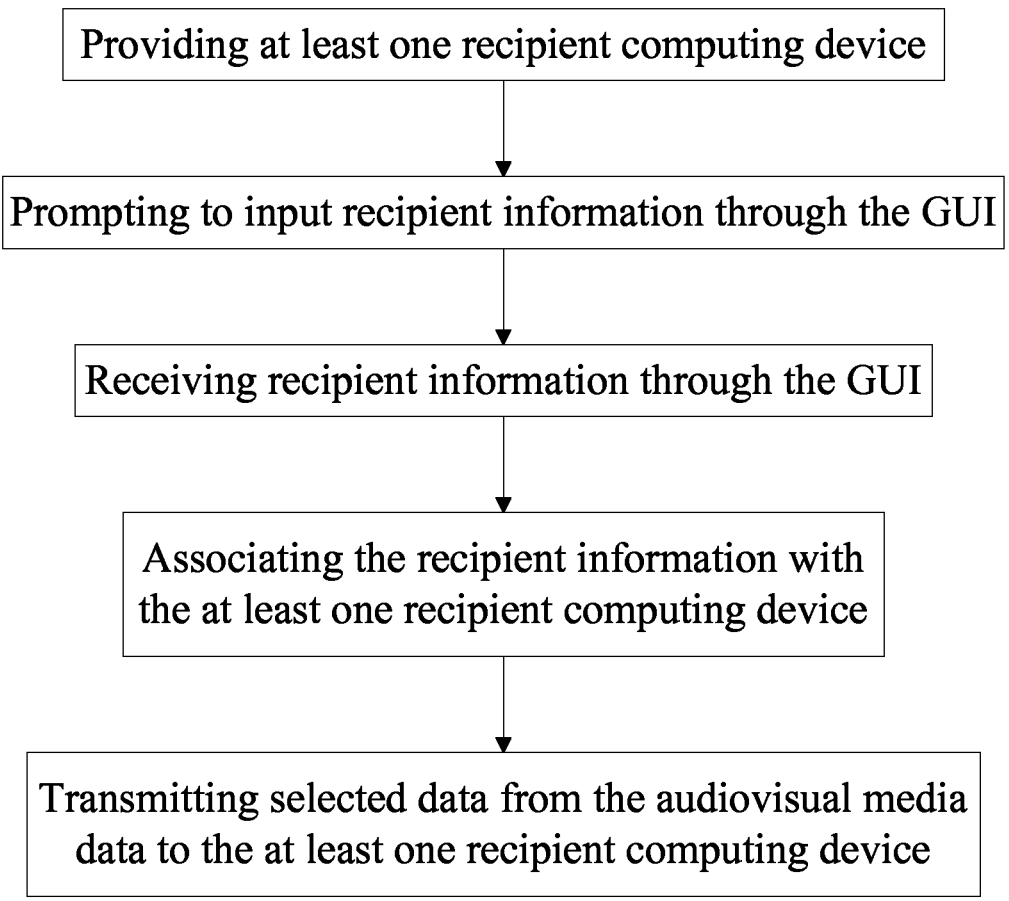
FIG. 9 is a flowchart depicting the secondary process that is followed by the present invention.

With reference to FIG. 9, the digital display 1 of the present invention is able to interface with at least one recipient computing device. The at least one recipient computing device is an Internet or wireless-enabled electronic device such as a smartphone, tablet computer, or personal computer (PC). The user is able to transmit selected data from the audiovisual media data to the at least one recipient computing device. The user is prompted to input recipient information through the GUI. Recipient information may include, but is not limited to, a telephone number and an email address. The recipient information is received through the GUI. The GUI may include a keyboard and/or numeric keypad for entering the recipient information. The recipient information is associated with the at least one recipient computing device in order to ensure that the selected data is transmitted to the at least one recipient computing device. The selected data from the audiovisual media data is then transmitted to the at least one recipient computing device. Wireless communications between the digital display 1 and the at least one recipient computing device may be accomplished via various wireless protocols including, but not limited to, Wi-Fi and Bluetooth. Wired communications may be utilized as well in lieu of wireless communications. This may be accomplished via Universal Serial Bus (USB) port or similar technology that is compatible with the aforementioned electronic devices.

Figure 10:
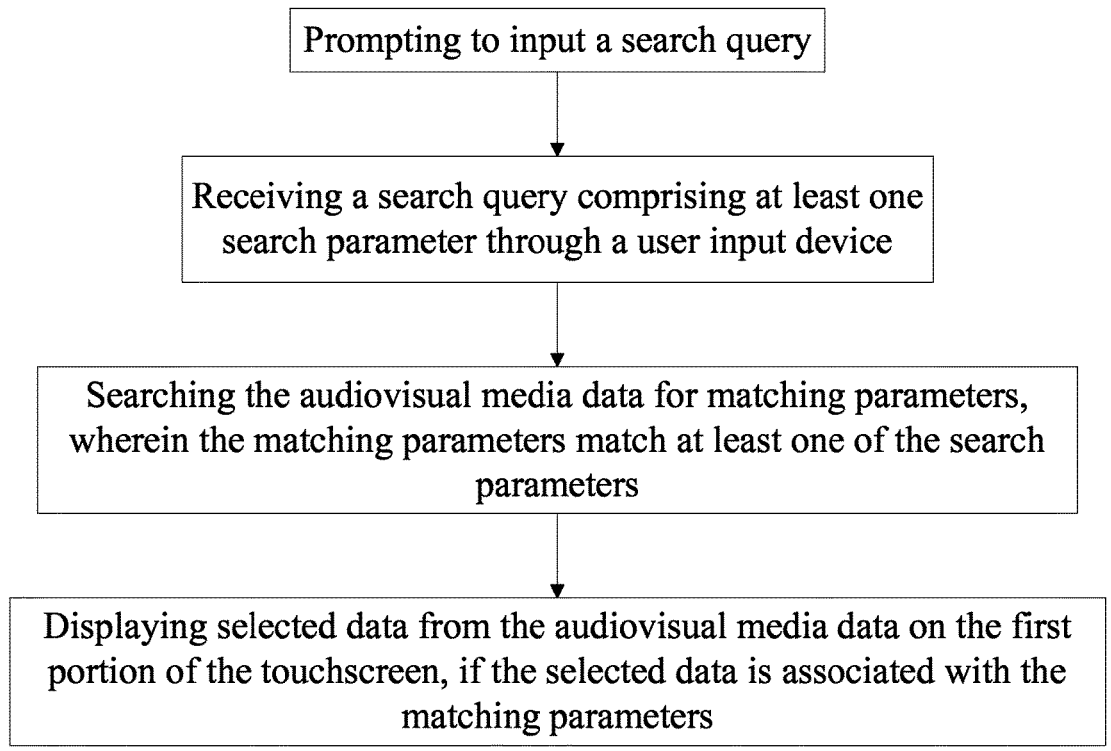
FIG. 10 is a flowchart depicting the secondary process that is followed by the present invention.

As previously discussed, date and time metadata is associated with the audiovisual media data when the audiovisual media data is saved to the data storage device. As shown in FIG. 10, the user is able to input a search query on the digital display 1 in order to locate and display previously captured audiovisual media data. A search query comprising at least one search parameter is received through a user input device. As shown in FIGS. 11-13, the user input device may be the GUI, the microphone 5, or an external electronic device. The at least one search parameter may include date and time metadata and/or a file name. The audiovisual media data is searched for matching parameters. A matching parameter matches at least one of the search parameters that is inputted by the user. Selected data from the audiovisual media data is displayed on the first portion 3 of the touchscreen 2 if the selected data is associated with the matching parameters. The user may then select the desired audiovisual media data to display on the first portion 3 of the touchscreen 2.

Figure 14:
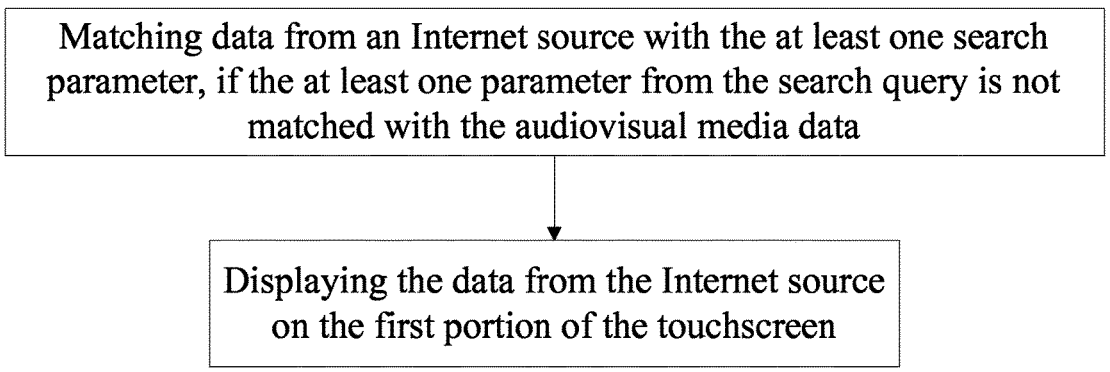
FIG. 14 is a flowchart depicting the secondary process that is followed by the present invention.

In the event that the at least one search parameter from the user's search query is not matched with the audiovisual media data, data from an Internet source is matched with the at least one search parameter as shown in FIG. 14. The user is able to define the at least one search parameter in order to find matching data that is not present on the digital display 1 but is readily available on the Internet. The data from the Internet source is then displayed on the first portion 3 of the touchscreen 2.

In addition to performing a search query through the external electronic device, the user is able to input provide commands for the digital display 1 through the external electronic device. The commands may be provided wirelessly or via a wired connection between the external electronic device and the digital display 1. User commands may include, but are not limited to, turning off the digital display 1, initiating video/image/audio capture, and accessing audiovisual media data on the data storage device.

Although the present invention has been explained in relation to its preferred embodiment, it is understood that many other possible modifications and variations can be made without departing from the spirit and scope of the present invention as hereinafter claimed.

What is claimed is:

1. A method for capturing and storing historic audiovisual data comprising:
providing a digital display, the digital display comprising a touchscreen, a microphone, at least one speaker and a data storage device;
providing an image-capture device, the image-capture device being coincident with the touchscreen;
activating the digital display
if at least one of a plurality of display activation triggers prompts to activate the digital display;
capturing a live video feed and audio feed by activating the image-capture device and the microphone;
displaying the live video feed on a first portion of the touchscreen;
displaying a graphical user interface (GUI) on a second portion of the touchscreen;
capturing audiovisual media data through the image-capture device and the microphone, the audiovisual media data comprising audio data, video data and image data;
saving the audiovisual media data to the data storage device;
associating date and time metadata with the audiovisual media data; and
utilizing the digital display as a mirror by deactivating the digital display and coating a surface of the touchscreen with a reflective and antifogging agent.

2. The method as claimed in claim 1 comprising:
prompting to record an authorized user fingerprint through the touchscreen;
recording the authorized user fingerprint through the touchscreen;
capturing a fingerprint through the touchscreen; and
comparing the fingerprint to the authorized user fingerprint in order to recognize the fingerprint as the authorized user fingerprint, the fingerprint being one of the plurality of display activation triggers.

3. The method as claimed in claim 1 comprising:
prompting to record an authorized iris image through the image-capture device;
recording the authorized iris image through the image-capture device;
capturing a user facial image through the image-capture device; and
comparing the user facial image to the authorized iris image in order to recognize the authorized iris image from the user facial image, the user facial image being one of the plurality of display activation triggers.

4. The method as claimed in claim 1 comprising:
prompting to record a vocal activation command through the microphone;
recording the vocal activation command through the microphone;
capturing a vocal input through the microphone; and
comparing the vocal input to the vocal activation command in order to recognize the vocal input as the vocal activation command, the vocal input being one of the plurality of display activation triggers.

5. The method as claimed in claim 1 comprising:
providing a motion sensor for the digital display, the motion sensor being coincident with the touchscreen; and activating the digital display
if the motion sensor detects movement in the vicinity of the digital display,
the movement being one of the plurality of display activation triggers.

6. The method as claimed in claim 1 comprising:
prompting to record an alphanumeric passcode through the GUI;
recording the alphanumeric passcode through the GUI;
receiving a haptic input through the GUI; and
comparing the haptic input to the alphanumeric passcode in order to recognize the haptic input as the alphanumeric passcode, the haptic input being one of the plurality of display activation triggers.

7. The method as claimed in claim 1 comprising:
providing at least one photovoltaic panel for the digital display, the at least one photovoltaic panel being externally mounted to the touchscreen;
providing a rechargeable power source, the rechargeable power source being electrically connected to the at least one photovoltaic panel; and
electrically charging the rechargeable power source through the at least one photovoltaic panel.

8. The method as claimed in claim 1 comprising:
providing at least one recipient computing device;
prompting to input recipient information through the GUI;
receiving recipient information through the GUI;
associating the recipient information with the at least one recipient computing device; and
transmitting selected data from the audiovisual media data to the at least one recipient computing device.

9. The method as claimed in claim 1 comprising:
prompting to input a search query;
receiving a search query comprising at least one search parameter through a user input device;
searching the audiovisual media data for matching parameters, the matching parameters matching at least one of the search parameters; and
displaying selected data from the audiovisual media data on the first portion of the touchscreen
if the selected data is associated with the matching parameters.

10. The method as claimed in claim 9 comprising:
receiving the search query through the GUI, the GUI being the user input device.

11. The method as claimed in claim 9 comprising:
receiving the search query through the microphone, the microphone being the user input device.

12. The method as claimed in claim 9 comprising:
receiving the search query through an external electronic device, the external electronic device being the user input device.

13. The method as claimed in claim 9 comprising:
matching data from an Internet source with the at least one search parameter
if the at least one search parameter from the search query is not matched with the audiovisual media data; and
displaying the data from the Internet source on the first portion of the touchscreen.

* * * * *